United States Patent
Sasaki (10) Patent No.: US 11,302,203 B2
(45) Date of Patent: Apr. 12, 2022

(54) DATA PROCESSING DEVICE, DRONE, AND CONTROL DEVICE, METHOD, AND PROCESSING PROGRAM THEREFOR

(71) Applicant: TOPCON CORPORATION, Tokyo (JP)

(72) Inventor: You Sasaki, Tokyo (JP)

(73) Assignee: TOPCON CORPORATION, Tokyo (JP)

(*) Notice: Subject to any disclaimer, the term of this patent is extended or adjusted under 35 U.S.C. 154(b) by 124 days.

(21) Appl. No.: 16/157,610

(22) Filed: Oct. 11, 2018

(65) Prior Publication Data
US 2019/0114929 A1 Apr. 18, 2019

(30) Foreign Application Priority Data
Oct. 12, 2017 (JP) .............................. JP2017-198399

(51) Int. Cl.
G08G 5/00 (2006.01)
B64C 39/02 (2006.01)
B60L 58/12 (2019.01)

(52) U.S. Cl.
CPC ............ G08G 5/0069 (2013.01); B60L 58/12 (2019.02); B64C 39/024 (2013.01); G08G 5/003 (2013.01); B64C 2201/042 (2013.01); B64C 2201/145 (2013.01); B64C 2201/146 (2013.01)

(58) Field of Classification Search
CPC ...... G08G 5/0069; G08G 5/003; B60L 58/12; B64C 39/024; B64C 2201/146; B64C 2201/042; B64C 2201/145; B64C 2201/14; G05D 1/101

USPC .......................................................... 701/3
See application file for complete search history.

(56) References Cited

U.S. PATENT DOCUMENTS

| 10,140,875 B1* | 11/2018 | Luo ................... G08G 5/0039 |
| 2014/0077969 A1* | 3/2014 | Vian ..................... G08C 17/02 340/870.02 |
| 2016/0068264 A1* | 3/2016 | Ganesh ................ B64C 39/024 701/2 |
| 2016/0280386 A1* | 9/2016 | Mestler ................ B64C 39/024 |
| 2016/0363456 A1* | 12/2016 | Pujos .................. G08G 5/0017 |
| 2016/0376004 A1* | 12/2016 | Claridge ................ B64C 19/00 701/3 |

(Continued)

FOREIGN PATENT DOCUMENTS

| JP | 2017-521292 A | 8/2017 | |
| KR | 101644151 B1 * | 8/2016 | .............. C25D 9/02 |

*Primary Examiner* — Jonathan M Dager
*Assistant Examiner* — Jean W Charleston
(74) *Attorney, Agent, or Firm* — Chiesa Shahinian & Giantomasi PC (57) ABSTRACT

Provided is a technique for controlling an unmanned aerial vehicle in flight according to a battery level. A drone control device controls a drone according to a battery level, including: a flight distance calculation unit, calculating a flight distance according to an airframe position at any time point and a landing place of the drone; a battery status acquisition unit, acquiring the battery level of the drone; an estimated battery consumption calculation unit, calculating an estimated battery consumption when the drone flies over the flight distance calculated by the flight distance calculation unit; and a return decision unit, deciding, on the basis of the battery level of the drone and the estimated battery consumption, whether the drone is capable of flying over the flight distance and return.

9 Claims, 4 Drawing Sheets

(56) References Cited

U.S. PATENT DOCUMENTS

| | | | |
|---|---|---|---|
| 2017/0075360 A1* | 3/2017 | Von Novak | B64C 27/08 |
| 2017/0113799 A1* | 4/2017 | Kovac | F03D 80/50 |
| 2017/0152051 A1* | 6/2017 | Sugaya | B64C 39/024 |
| 2018/0046172 A1* | 2/2018 | Tao | G05B 23/0218 |
| 2018/0061247 A1* | 3/2018 | Brown | B64C 39/024 |
| 2018/0141656 A1* | 5/2018 | Heinonen | G08G 5/0069 |
| 2018/0194466 A1* | 7/2018 | Zhao | G05D 1/102 |
| 2018/0292817 A1* | 10/2018 | Yang | G08G 5/0043 |
| 2019/0012636 A1* | 1/2019 | Simon | G08G 5/0013 |
| 2019/0047701 A1* | 2/2019 | Winkle | H02J 7/342 |
| 2019/0265705 A1* | 8/2019 | Zhang | B64C 39/024 |
| 2020/0050200 A1* | 2/2020 | Torii | B64F 1/22 |

* cited by examiner

DATA PROCESSING DEVICE, DRONE, AND CONTROL DEVICE, METHOD, AND PROCESSING PROGRAM THEREFOR

CROSS REFERENCE TO RELATED APPLICATIONS

This application claims priority of Japanese Patent Application No. 2017-198399, filed Oct. 12, 2017, the entire disclosure of which is incorporated by reference herein.

TECHNICAL FIELD

The present disclosure relates to a technique for controlling according to a battery level an unmanned aerial vehicle (hereinafter referred to as "drone" for short) in flight.

BACKGROUND ART

Japanese Patent Publication No. 2017-521292 discloses a technique for calculating a remaining battery level required for a drone to return and generating an alarm signal.

SUMMARY

Problem to be Solved by the Present Disclosure

In flight of a drone such as a UAV (Unmanned Aerial Vehicle), a distance over which the drone can fly after any time point changes with a battery level at the anytime point. Particularly, when returning, if the battery level is insufficient, the drone have to directly land on the ground, thus causing risks such as the drones may be inundated or damaged. Therefore, an object of the present disclosure is to provide a technique for controlling according to a battery level a drone in flight so as to ensure the battery level required for return thereof.

Means for Solving the Problem

A disclosure according to a first aspect is a drone control device, capable of controlling a drone according to a battery level, which comprises: a flight distance calculation unit, configured to calculate, according to a landing position of the drone and an airframe position at any time point, a flight distance; a battery status acquisition unit, configured to acquire the battery level of the drone; an estimated battery consumption calculation unit, configured to calculate an estimated battery consumption when the drone flies over the flight distance calculated by the flight distance calculation unit; and a return decision unit, configured to decide, on the basis of the estimated battery consumption and the battery level of the drone, whether the drone is capable of flying over the flight distance and return.

A disclosure according to a second aspect is characterized in that in the disclosure according to the first aspect, the battery status acquisition unit is configured to acquire the battery level of the drone and a battery consumption corresponding to an action performed by the drone in flight. A disclosure according to a third aspect is characterized in that in the disclosure according to the first aspect or the second aspect, the battery status acquisition unit is configured to acquire a battery consumption after the flight is started; and the estimated battery consumption calculation unit is configured to calculate on the basis of the battery consumption, the estimated battery consumption.

A disclosure according to a fourth aspect is characterized in that in the disclosure according to any one of the first to the third aspects, the estimated battery consumption calculation unit is configured to correct the calculated estimated battery consumption, according to at least one of the flight distance calculated by the flight distance calculation unit and the battery consumption after the flight is started.

A disclosure according to a fifth aspect is that in the disclosure according to the fourth aspect, the estimated battery consumption is corrected in a manner of making the estimated battery consumption relatively higher, when the flight distance calculated by the flight distance calculation unit is relatively long; and the estimated battery consumption is corrected in a manner of making the estimated battery consumption relatively higher, when the battery consumption after the flight is started is relatively high. A disclosure according to a sixth aspect is characterized in that the disclosure according to any one of the first to the fifth aspects comprises a return signal generation unit, configured to generate a signal reminding the drone to return.

A disclosure according to a seventh aspect is characterized in that the disclosure according to any one of the first to the sixth aspects comprises a return signal generation unit, configured to generate a signal capable of making the drone return or making a data processing device outside the drone display a signal recommending the drone to return. A disclosure according to an eighth aspect is characterized in that the disclosure according to any one of the first to the seventh aspects comprises a landing position reception unit, configured to receive one or more landing information of the drone; and an airframe position reception unit, configured to receive airframe position information of the drone at any time point.

A disclosure according to a ninth aspect is a drone having the disclosure according to any one of the first to the eighth aspects. A disclosure according to a tenth aspect is a data processing device having the disclosure according to any one of the first to the eighth aspects.

A disclosure according to an eleventh aspect is a drone control method, comprising: a step of calculating a flight distance, in which the flight distance is calculated according to an airframe position at any time point and a landing position of the drone; a step of acquiring a battery status, in which a battery level of the drone is acquired; a step of calculating estimated battery consumption calculation, in which the estimated battery consumption when the drone flies over the flight distance calculated in the step of calculating a flight distance, is calculated; and a step of deciding to return, in which whether the drone is capable of flying over the flight distance and return is decided, on the basis of the estimated battery consumption and the battery level of the drone.

A disclosure according to a twelfth aspect is a program for controlling a drone, which is a control program read and executed by a computer to control a drone according to a battery level, wherein the computer is enabled to perform following functions: a flight distance calculation unit calculates a flight distance, according to an airframe position at any time point and a landing place of the drone; a battery status acquisition unit acquires the battery level of the drone; an estimated battery consumption calculation unit calculates an estimated battery consumption when the drone flies over the flight distance calculated by the flight distance calculation unit; and a return decision unit decides, on the basis of the estimated battery consumption and the battery level of the drone, whether the drone is capable of flying over the flight distance and return.

Effects of the Disclosure

The present disclosure provides a technique for controlling a drone such as a UAV in flight according to the battery level, thus obtaining the remaining battery level required for the return. For example, when the UAV having a camera is flying while performing terrain photogrammetry, the flight of the UAV and the photogrammetry performed by the camera are main factors decreasing the battery level, and these main factors exist continuously in flight, thus, by continuously performing the calculation of the remaining battery level required for the return and judging whether to return according to the calculation result, cases that the drone cannot return can be avoided.

DETAILED DESCRIPTION

1. First Embodiment (Overview)

Figure 1:
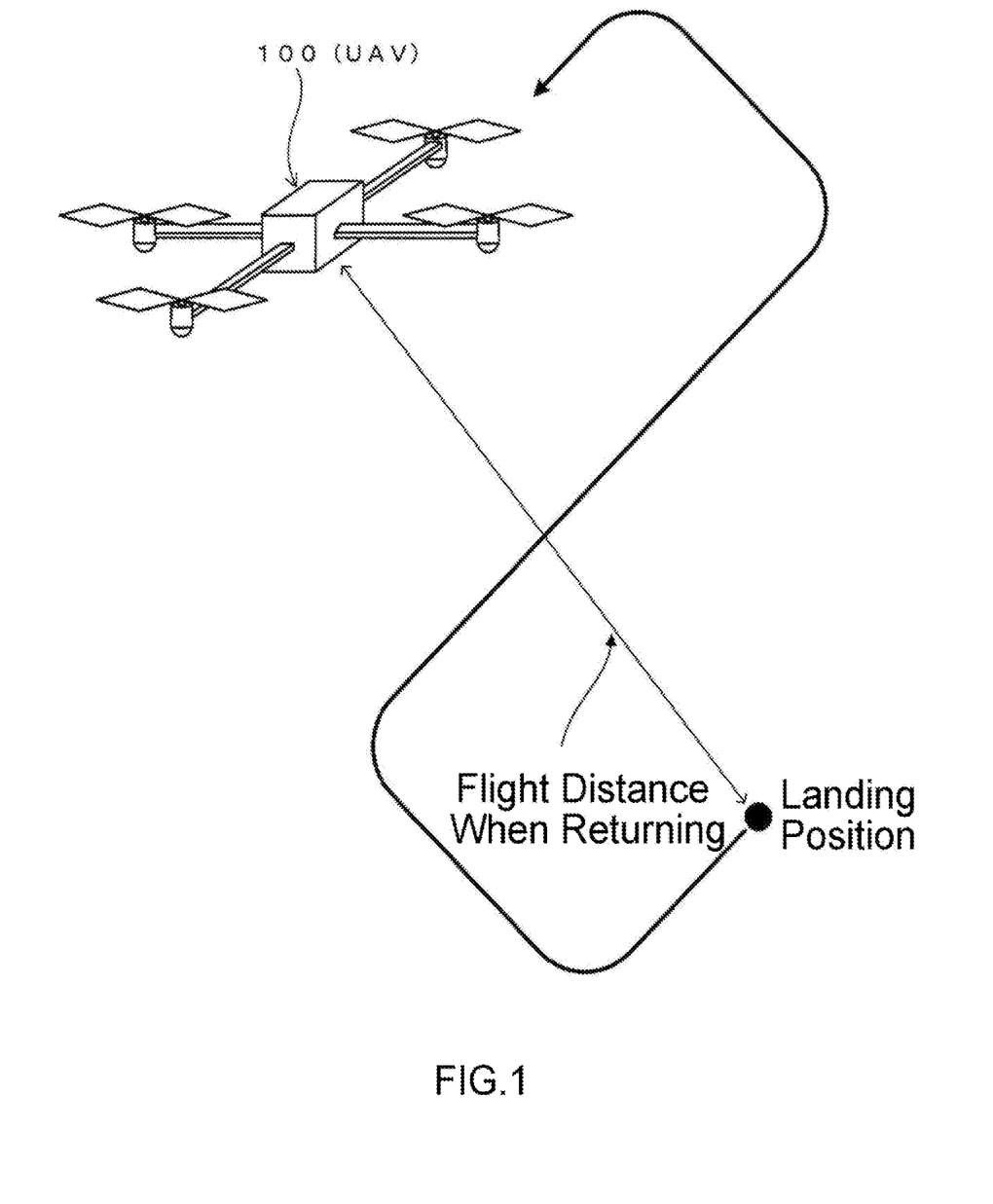
FIG. 1 is a conceptual diagram of an embodiment.

FIG. 1 shows a conceptual diagram of an embodiment. In the present embodiment, a UAV 100 masters its own battery level (a remaining battery level), and records in a flight log a battery level consumed by performing each flight action while flying. Moreover, a flight distance from its own position to a landing (returning) place and a battery level required for flying over this distance are calculated in a flying process. The calculated battery level is compared with the remaining battery level of the UAV 100, to judge whether to remind returning.

Besides, the UAV 100 used in the present embodiment not only may fly autonomously along a predetermined flight route, but also may be in a flying state in which flight is controlled by an operator via wireless manipulation.

(Structure of the UAV)

Figure 2:
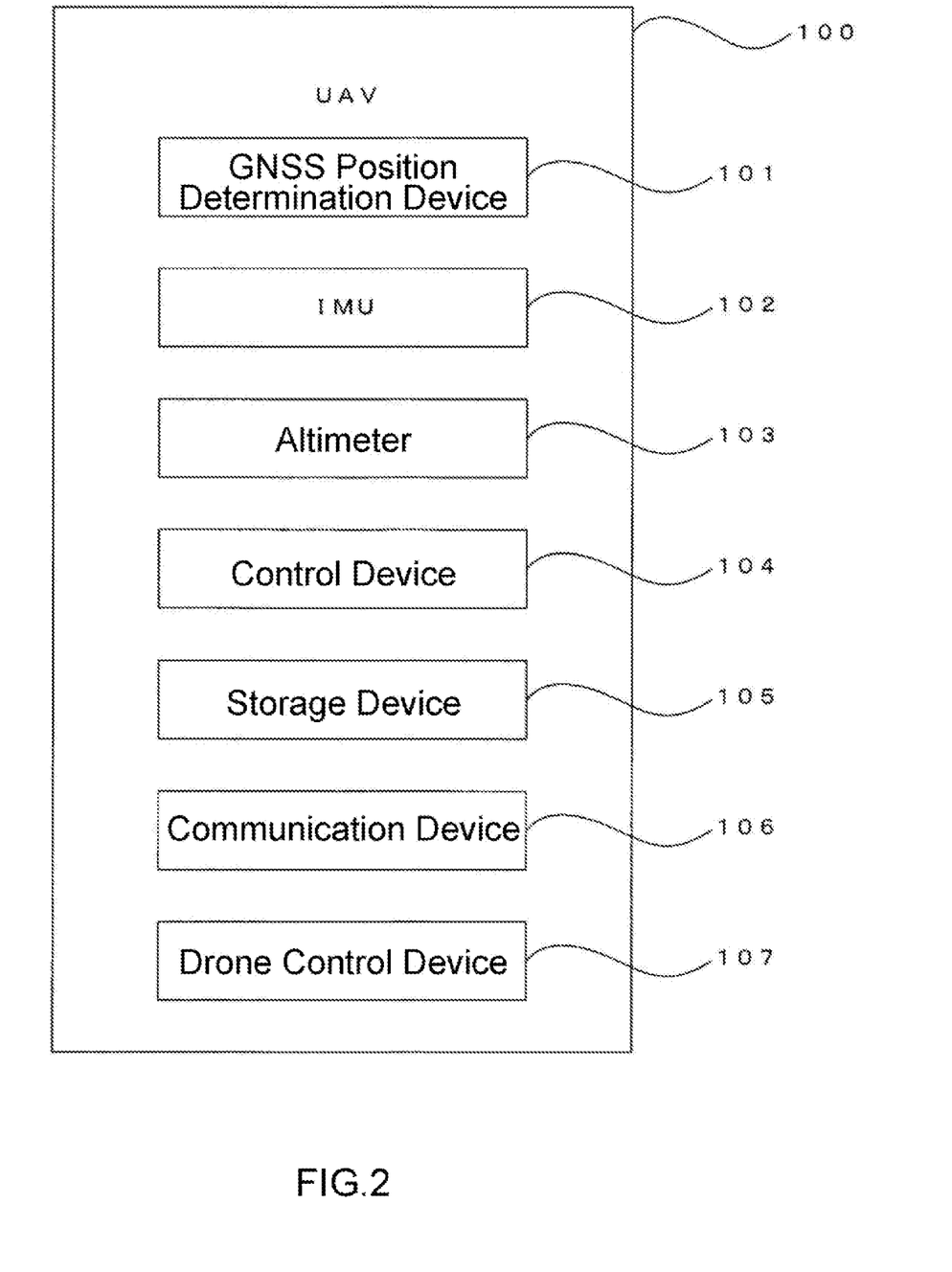
FIG. 2 is a block diagram of a UAV.

The UAV 100 shown in FIG. 2 comprises: a GNSS position determination device (GNSS receiver) 101 using a GNSS, an IMU (inertia measurement device) 102, an altimeter 103, a control device 104, a storage device 105, a communication device 106, a drone control device 107, other direction sensors and so on. Besides, this is a common structure of a UAV, but the UAV 100 has a propeller generating a pushing force for flying, a motor driving the propeller, and a battery supplying power for driving the motor. An object of the present disclosure is the control related to the remaining battery level. In addition, although description is omitted, the UAV 100 is equipped with a camera for taking a still image or a video, various sensors and so on.

The GNSS position determination device 101 receives a navigation signal from a navigation satellite represented by a GPS satellite, and performs positioning (determination of a position) on the basis of the navigation signal. A position (longitude/latitude/altitude) of the GNSS position determination device 101 (a position of an antenna of the GNSS position determination device 101) in a map coordinate system is determined by the GNSS position determination device 101. The map coordinate system is a global coordinate system used in processing map data. Data on the position obtained by the GNSS position determination device 101 (for example, a general-purpose GPS receiver) is obtained as data in the map coordinate system.

For the positioning performed by the GNSS position determination device 101, Point Positioning is used due to a usual problem of cost, but Relative Positioning capable of highly precisely acquiring position information of an airframe also may be used. As to a technique of the Relative Positioning, for example, position measurement with high precision (with an error of several centimeters or less) using RTK (Real Time Kinematic) positioning may be exemplified. Regarding the RTK positioning, it is described for example on the homepage of Geospatial Information Authority of Japan (http://terras.gsi.gojp/geo_info/GNSS_iroiro.html).

In the RTK positioning, a fixed base station (GNSS or TS (total station) with a GNSS device, etc.) is prepared at a site where photogrammetry is performed, and the fixed base station, the UAV 100 for photographing, and a UAV 200 for pass point communicate with each other while performing positioning. By the positioning, a positional relation between the UAV 100 for photographing and the UAV 200 for pass point can be achieved with high precision.

Besides, the GNSS position determination device 101 has a clock function, and the position information of the UAV 100 is stored in the flight log together with time information.

An IMU 102 measures an acceleration applied to the UAV 100 in flight. An output from the IMU 102 is used for an attitude control of the UAV 100 in flight. Besides, information related to the attitude of the UAV 100 in flight is obtained according to the output from the IMU 102. The altimeter 103 measures an air pressure, and measures an altitude of the UAV 100.

The control device 104 performs various controls related to the UAV 100. The various controls related to the UAV 100 include flight control, control related to management of data stored in a storage device 105, and control related to an action of a communication device 106.

The storage device 105 stores a flight plan and a flight log for flight on a predetermined flight path. The flight log is data in which a position (longitude, latitude, altitude) in flight, the battery level (the remaining battery level) of the UAV 100, and data on measurement time are stored. The measurement of the position in flight and the battery level is performed at a specific interval of each 0.5 seconds or each 1 second (of course, the interval also may be irregular), and the data of the position and the battery level measured in real time are stored in the flight log in association with the measurement time. Besides, data related to the attitude of the UAV 100 measured by the IMU 102, and data of the altitude measured by the altimeter 103 are also stored in the storage device 105 in a state of being associated with the flight log.

The communication device 106 has a wireless communication function. The communication device 106 performs communication between the UAV 100 100 and an operating device (a controller operated by an operator on the ground operating the UAV 100). In addition, the communication device 106 sends various data (for example, data of an image taken, data of the position, etc.) to the outside.

Besides the wireless communication function, the communication device 106 further has a wired communication function. The communication device 106 uses the wired communication function to perform communication between the UAV 100 in a non-flying state (a landing state) and other devices. For example, reception of a signal related to a flight operation (reception of a control signal from an operation controller), reception of data of the flight plan, transmission of the data of the flight log to other devices, and so on are performed by the communication device 106. Besides, the communication device 106 also may have an optical communication function.

The drone control device 107 calculates a battery level required for return according to a distance that the UAV 100 has to fly over for return and a battery consumption status required by performing various flight actions (airframe rising, airframe attitude control, etc.) in return flight at any time point. Then, whether the UAV 100 is to return is judged by comparing the calculated battery level required for return with the battery level (the remaining battery level) of the UAV 100. Besides, the drone control device 107 also may be in a form of one of functional units of the control device 104.

Techniques for measuring (calculating) the battery level at any time point include a voltage measuring manner by measuring terminal voltages of a battery cell, a coulomb metering manner by performing measurement according to plus and minus operations of a current amount flowing into the battery cell and a current amount flowing out of the battery unit, and so on, but as to the technique with the highest measurement precision, an Impedance track manner may be exemplified. The Impedance track manner refers to a manner of measuring an impedance of a battery after collecting and updating discharging properties or temperature properties with no load when the battery is used each time, and calculating a battery level. The measurements of the battery level (the remaining battery level) in these manners are performed by a specific IC. Various types of such an IC are available on the market.

(Structure of the Drone Control Device)

Figure 3:
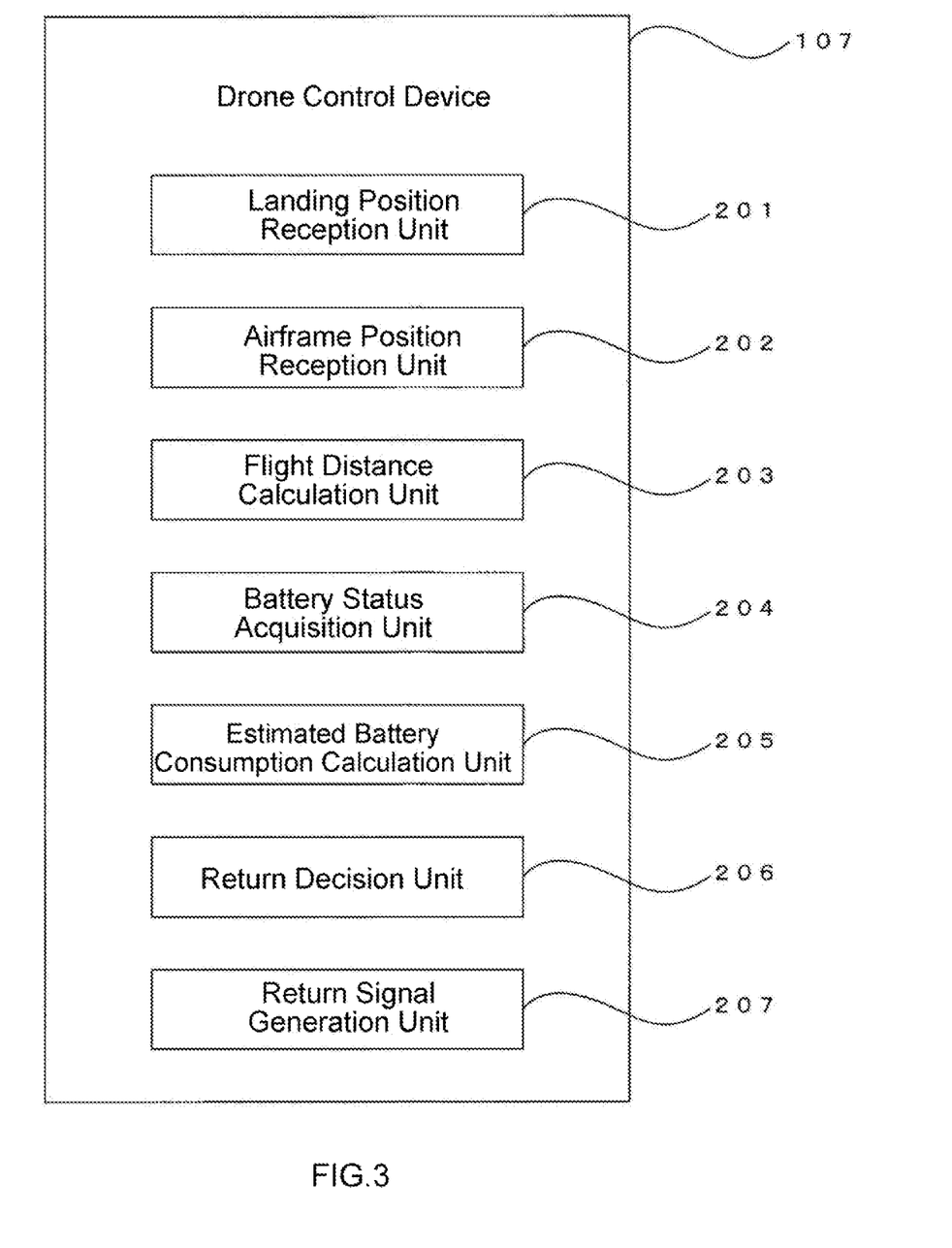
FIG. 3 is a block diagram of a drone control device.

FIG. 3 is a block diagram of the drone control device 107. The drone control device 107 comprises: a landing position reception unit 201, an airframe position reception unit 202, a flight distance calculation unit 203, a battery status acquisition unit 204, an estimated battery consumption calculation unit 205, a return decision unit 206, and a return signal generation unit 207.

Each functional unit of the drone control device 107 shown in FIG. 3 is constructed by, for example, an electronic circuit such as a CPU (Central Processing Unit), an ASIC (Application Specific Integrated Circuit), a PLD (Programmable Logic Device) represented by an FPGA (Field Programmable Gate Array), and the like. Besides, it is also possible to construct a part of functions by specific hardware, and construct the other part by a general-purpose microcomputer.

Whether the various functional units are constructed by specific hardware or constructed by software executing programs in a CPU is determined in view of a required operation speed, costs, power consumption and so on. Moreover, viewing from a perspective of realizing a specific function, constructing the functional units by specific hardware and constructing the functional units by software are equivalent.

The landing position reception unit 201 receives position information of a place where the UAV 100 is intended to return or land. Besides, the number of the received position information is not limited to one, or may also be more than one.

The airframe position reception unit 202 receives the position information of the UAV 100 determined by the GNSS position determination device 101 at any time point. In case of an embodiment in which there is no drone control device 107 in the UAV 100 while there is the drone control device 107 in an outside data processing device or the like, the reception of the position information of the UAV 100 is performed by receiving the position information from the communication device 106 of the UAV 100. Since the present disclosure is used in a flying process of the UAV 100, the position of the UAV 100 changes all the time. Therefore, an interval for receiving the position information of the UAV 100 is set to be as short as possible.

The flight distance calculation unit 203 calculates the flight distance for return according to the position information of a return (landing) place obtained by the landing position reception unit 201 and the position information of the UAV 100 obtained by the airframe position reception unit 202. If the landing position reception unit 201 receives position information of multiple return (landing) places, the flight distances of the same number as the number of the received return (landing) places are calculated. Herein, a general flying mode when the UAV returns is that in order to avoid obstacles, after rising up to a highest place in flight, the UAV straightly flies to overhead the return place, and then descends to the return place. If this method is also used in the present embodiment, the position of the UAV 100 is set as $(X_n, Y_n, Z_n)$ in a three-dimensional coordinate system, a distance of rising from a current altitude to the highest flying altitude is set as Z, and the position of the return (landing) place is set as $(X_0, Y_0, Z_0)$ in the three-dimensional coordinate system, in this case a flight distance R of the UAV 100 is expressed by the following Expression 1.

$$R = Z + \sqrt{(X_n-X_0)+(Y_n-Y_0)^2} + \{(Z_n+Z)-Z_0\} \quad \text{Expression 1:}$$

Moreover, in the present disclosure, regardless of the return method or path that is set, the present disclosure can be implemented as long as the flight distance can be calculated, therefore, a return method (path) setting unit also may be provided in the drone control device 107 such that an embodiment of any return method (path) can be set.

The battery status acquisition unit 204 acquires the battery level of the UAV 100 or the battery consumption corresponding to each action when the UAV 100 is flying. The battery consumption is defined by, for example, a current amount per time unit. In addition, in case of an embodiment in which there is the drone control device 107 in the outside data processing device or the like, data related to the battery consumption is output from the communication device 106 of the UAV 100, and the data is acquired by the battery status acquisition unit 204. Besides, since the battery level of the UAV 100 is changing (decreasing) continuously due to the flight of the UAV 100, an acquisition interval is set as short as possible.

For the battery consumption corresponding to each action when the UAV 100 is flying, if it is obtained in a manner set in advance and so on, it is not necessarily acquired by the battery status acquisition unit 204.

However, for the battery consumption corresponding to each action when the UAV 100 is flying, sometimes due to influence of wind to the airframe, changes of weight or air resistance caused by different load items, aging of the battery, and so on, the battery consumption is different in each time of flight. Therefore, if the battery consumption affected by the conditions in flight can be obtained, the calculation precision (estimation precision) of the estimated battery consumption can be increased. For example, in cases where more load items are loaded to the UAV 100, and the weight of the airframe is increased than usual, the battery consumption corresponding to each action in flight will be increased in proportion thereto, at the same time, the estimated battery consumption also will be increased.

The estimated battery consumption calculation unit 205 calculates the battery level estimated to be consumed when the UAV 100 flies over the flight distance calculated by the flight distance calculation unit 203, on the basis of the battery consumption corresponding to each action when the UAV 100 is flying acquired by the battery status acquisition unit 204. If multiple flight distances are calculated in the flight distance calculation unit 203, the estimated battery consumptions are calculated respectively.

For a method for calculating the estimated battery consumption, for example, when returning, if rising up to the highest altitude in flight, then straightly flying to overhead a destination, and then descending, it is obtained from the flight log that a battery capacity required for the UAV 100 to rise up by 1 m is $W_u$, a battery capacity required for straightly flying by 1 m is $W_s$, a battery capacity required for descending by 1 m is $W_d$, then when units of Z, $\{(X_n-X_0)^2+(Y_n-Y_0)^2\}^{1/2}$, and $\{(Z_n+Z)-Z_0\}$ in Expression 1 are set as m (meter), a battery level $W_t$ estimated to be consumed when returning can be calculated by the following Expression 2.

$$W_t = W_u \cdot Z + W_s \cdot \sqrt{(X_n-X_o)^2+(Y_n-Y_o)^2} + W_d \cdot \{(Z_n+Z)-Z_o\} \quad \text{Expression 2:}$$

A method for calculating the estimated battery consumption also may be a method with higher precision or a method with lower precision according to requirements or situation of users of the present disclosure.

The return decision unit 206 compares the battery level of the UAV 100 acquired by the battery status acquisition unit 204 with the estimated battery consumption in return flight calculated by the estimated battery consumption calculation unit 205, so as to judge whether to remind the UAV 100 to return. Specifically, although the UAV 100 can return, it is still decided whether it is close to a time point when the UAV 100 cannot return, and when it is decided that the UAV 100 is capable of returning but is close to the time point when the UAV 100 cannot return, the return decision unit 206 decides to remind returning, and otherwise, puts off the decision.

When the return decision unit 206 decides that the UAV 100 should be reminded to return, the return signal generation unit 207 generates a return signal. The generated return signal may be a form of sending a return action to the UAV 100, and also may be a form of sending an alarm to an operator operating or monitoring the UAV 100.

(One Example of Processing)

Figure 4:
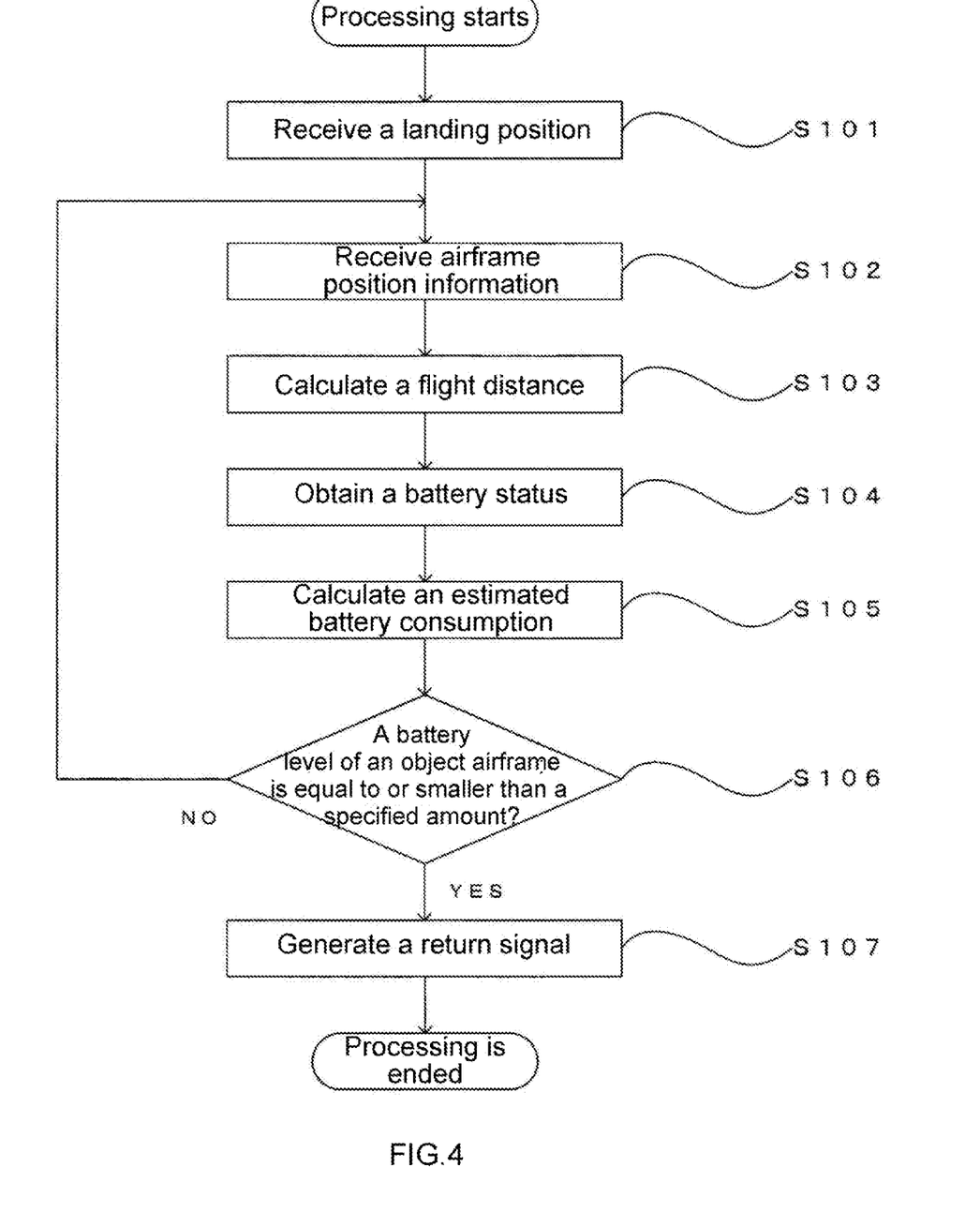
FIG. 4 is a flow chart showing one example of processing.

FIG. 4 shows one example of processing in the present embodiment. Firstly, the UAV 100 receives the position information of the landing place or the return place. Besides, time for receiving the position information of the landing place or the return place may be before the UAV 100 starting to fly, and also may be in the flying process (Step S101). Besides, in a stable mode, the flight is started, and a place where the flight is started is set as a return position. Subsequently, current position information of the UAV 100 is acquired (Step S102). Subsequently, a flight distance is calculated according to the position information of the landing place or return place received in Step S101 and the position information of the UAV 100 acquired in Step S102. The flight distance calculated herein is the distance required for the return (Step S103).

Subsequently, the battery level of the UAV 100 and the battery level consumed when the UAV 100 performs each action in flight are received (Step S104). The estimated battery consumption when returning is calculated according to the flight distance calculated in Step S103 and the battery level consumed by performing each flight action received in Step S104 (Step S105).

The battery level of the UAV 100 received in Step S104 and the estimated battery consumption calculated in Step S105 are compared, and if the estimated battery consumption is equal to or smaller than a specified amount (an amount obtained by adding a surplus α to the estimated battery consumption), it is judged that the UAV 100 should be reminded to return. Moreover, if the estimated battery consumption is above the specified amount, the battery level of the UAV 100 is managed by returning back to Step S102 and repeating the processing (Step S106).

In Step S106, when it is judged that the UAV 100 should be reminded to return, the return signal is generated, and the processing is ended (Step S107). For example, the return signal is sent to the control device 104, and the control device 104, upon reception of the return signal, performs flight control to make the UAV 100 return. Besides, the return signal is sent to a controller of an manipulator, and an informing process is performed by the controller using a display or a warning light.

In Step S106, the specified amount is used as criteria for judging whether to return. For the surplus α constituting the specified amount, it is also quite necessary to prepare the surplus α for battery consumption factors out of estimation such as strong winds occurring during the return of the UAV 100. An occurrence rate of the battery consumption factors out of estimation is increased in proportion to the increase of the flight distance of the UAV 100. Therefore, a threshold is set for the flight distance, and when the flight distance exceeds the threshold, preparation can be made for the occurrence of the battery consumption factors out of estimation by increasing the value of the surplus α or changing the value of the surplus α in proportion to the flight distance.

That is, when the return distance required for the return is relatively long, it is estimated that a possibility of occurrence of factors of forced power consumption (for example, influence of wind or unfavorable airframe condition and so on) increases, therefore, the surplus α is estimated to be larger. For example, the return distance is set as L, when L<100 m, α is set as 10% of the estimated battery consumption; when 100 m≤L<150 m, α is set as 20% of the estimated battery consumption; when 150 m≤L, α is set as 30% of the estimated battery consumption. By doing so, the longer the distance required for the return, the more surplus for the battery consumption is set, such that occurrence of accidents caused by an insufficient remaining battery level on a way returning can be suppressed.

Besides, the value of the surplus α also may be changed on the basis of the battery level of the UAV 100 received in Step S104 and the battery consumption when the UAV 100 performs each flight action in the flying process. For example, when the battery is consumed more quickly than ever before in cases where the same flight action is performed, it is judged that some factors of battery aging or forced battery consumption appear, thus the surplus α is increased. Besides, the surplus α also may be a value obtained by multiplying the estimated battery consumption by a surplus rate. In addition, it is also feasible to set the form of the surplus α according to both the battery level and a predetermined flight distance.

(Variant)

The number of landing position information received by the landing position reception unit 201 also may be multiple. That is, if there is still a place where the UAV 100 can land in addition to a take-off place of UAV 100, this position may be taken as a candidate return destination to determine whether to remind returning.

For the processing when there are multiple received position information, the same number of the flight distances as the number of the received landing positions are calculated, and the estimated battery consumption of the flight distance corresponding to each of the landing positions is calculated respectively.

Then, it is judged whether to remind returning using the same number of the estimated battery consumptions as the number of the landing positions received by the landing position reception unit 201. As an example of the judging method, a following method may be exemplified: a highest estimated battery consumption is selected from multiple estimated battery consumptions, and if it is equal to or smaller than the specified amount, a remind of returning is made. If this method is used, regardless of the landing positions, the UAV 100 can return.

2. Others

The present disclosure is not limited to the embodiments of the drone such as the UAV. For example, the embodiments also may be embodiments of a data processing device, and the data processing device, by communicating with the UAV, can acquire the position information and the battery level of the UAV, as well as the battery level consumed by the UAV when performing each action in flight. Besides, the embodiments also may be embodiments in which the position information of the UAV is acquired by performing track positioning using the TS (total station).

INDUSTRIAL APPLICABILITY

The present disclosure can be used to judge the time point for return of drones.

What is claimed is:

1. A drone control device, capable of controlling a drone according to a battery level, comprising:
   a flight distance calculation unit, configured to calculate a flight distance, according to an airframe position at any time point, a highest attitude attained during a current flight, and a landing place of the drone;
   a battery status acquisition unit, configured to acquire the battery level of the drone;
   an estimated battery consumption calculation unit, configured to calculate an estimated battery consumption when the drone flies over the flight distance calculated by the flight distance calculation unit, the estimated battery consumption calculated based on a battery consumption corresponding to actions performed by the drone while in flight, the estimated battery consumption is corrected in a manner of making the estimated battery consumption relatively higher, when the flight distance calculated by the flight distance calculation unit is relatively long, and the estimated battery consumption is corrected in a manner of making the estimated battery consumption relatively higher, when the battery consumption after the flight is started is relatively high; and
   a return decision unit, configured to decide, on the basis of the estimated battery consumption and the battery level of the drone, whether the drone is capable of flying over the flight distance and return.

2. The drone control device of claim 1,
   wherein the battery status acquisition unit is configured to acquire the battery level of the drone and the battery consumption corresponding to the actions performed by the drone while in flight.

3. The drone control device of claim 1,
   wherein the battery status acquisition unit is configured to acquire the battery consumption after the flight is started.

4. The drone control device of claim 1,
   wherein the estimated battery consumption calculation unit is configured to correct the calculated estimated battery consumption, according to at least one of the flight distance calculated by the flight distance calculation unit and the battery consumption after the flight is started.

5. The drone control device of claim 1, comprising:
   a return signal generation unit, configured to generate a signal reminding the drone to return.

6. The drone control device of claim 1, comprising:
   a return signal generation unit, configured to generate a signal capable of making the drone return or making a data processing device outside the drone display a signal recommending the drone to return.

7. The drone control device of claim 1, comprising:
   a landing position reception unit, configured to receive one or more landing information of the drone; and
   an airframe position reception unit, configured to receive airframe position information of the drone at any time point.

8. A drone control method, capable of controlling a drone according to a battery level, comprising:
   a step of calculating a flight distance, in which a flight distance is calculated according to an airframe position at any time point, a highest attitude attained during a current flight, and a landing position of the drone;
   a step of acquiring a battery status, in which a battery level of the drone is acquired;
   a step of calculating estimated battery consumption, in which the estimated battery consumption when the drone flies over the flight distance calculated in the step of calculating a flight distance, is calculated based on a battery consumption corresponding to actions performed by the drone while in flight, the estimated battery consumption is corrected in a manner of making the estimated battery consumption relatively higher, when the flight distance calculated by the flight distance calculation unit is relatively long, and the estimated battery consumption is corrected in a manner of making the estimated battery consumption relatively higher, when the battery consumption after the flight is started is relatively high; and
   a step of deciding to return, in which whether the drone is capable of flying over the flight distance and return is decided, on the basis of the estimated battery consumption and the battery level of the drone.

9. A program for controlling a drone, which is a control program stored on a non-transitory computer readable medium and read and executed by a computer to control the drone according to a battery level, wherein the computer is made to perform following functions:
   a flight distance calculation unit calculates a flight distance, according to an airframe position at any time point, a highest attitude attained during a current flight, and a landing place of the drone;
   a battery status acquisition unit acquires the battery level of the drone;
   an estimated battery consumption calculation unit calculates an estimated battery consumption when the drone flies over the flight distance calculated by the flight distance calculation unit, the estimated battery consumption calculated based on a battery consumption corresponding to actions performed by the drone while in flight, the estimated battery consumption is corrected in a manner of making the estimated battery consumption relatively higher, when the flight distance calculated by the flight distance calculation unit is relatively long, and the estimated battery consumption is corrected in a manner of making the estimated battery consumption relatively higher, when the battery consumption after the flight is started is relatively high; and a return decision unit decides, on the basis of the estimated battery consumption and the battery level of the drone, whether the drone is capable of flying over the flight distance and return.

\* \* \* \* \*